Figure 1:
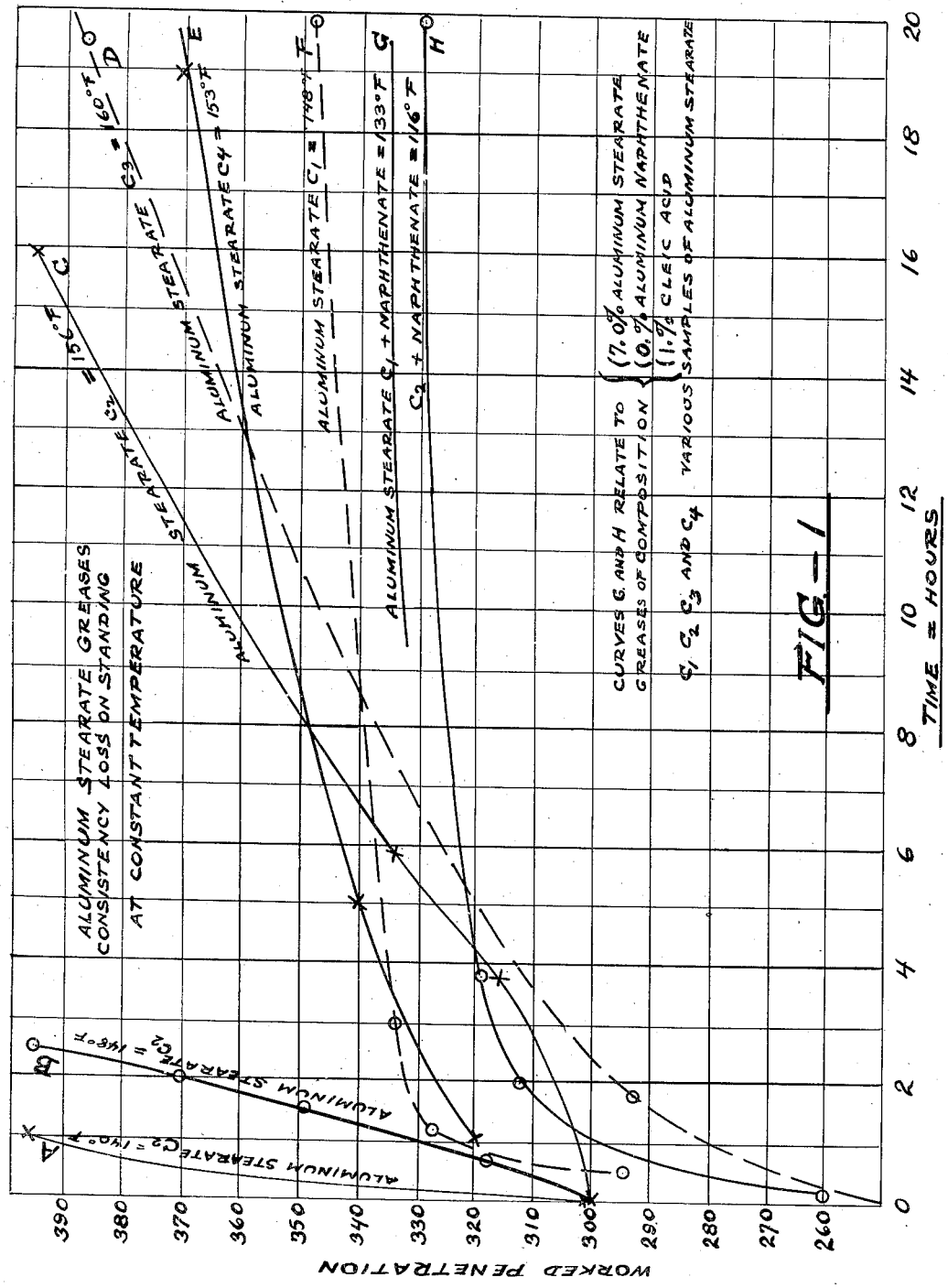

Patented July 31, 1945

2,380,893

UNITED STATES PATENT OFFICE 2,380,893

LUBRICATING GREASE COMPOSITION

John C. Zimmer, Union, and Arnold J. Morway, Clark Township, Union County, N. J., assignors to Standard Oil Development Company, a corporation of Delaware Application October 24, 1941, Serial No. 416,313
In Canada November 15, 1937

10 Claims. (Cl. 252—37)

This invention relates to compositions adapted for the lubrication of machinery operated under conditions of local high temperature increases, of irregular and shock load effects or where the machinery is exposed to a muddy or water-drenching environment, and where frictional forces beyond the film strength of any hydrocarbon lubricating oil base material are frequently encountered. The invention relates more specifically to semi-fluid grease compositions containing aluminum stearate as the main soap constituent adapted for the lubrication of chassis parts of automobiles and crawler-type tractors. The present application is a continuation-in-part of our copending application Serial No. 255,452 filed on February 9, 1939, now Patent No. 2,264,-353 and also is related in subject matter to our copending application, Serial No. 416,314 also filed on October 24, 1941.

For the lubrication of machinery for which compositions of this invention are adapted, the illustration of the satisfactory operation of a typical track roller may be taken. The lubricant in that case is forced under pressure into the main roller mechanism through the hollow shaft and the composition has to flow largely under its own weight during operation from this supply to the bearing parts of the mechanism, otherwise inaccessible to the composition. Also, a quantity of lubricant in excess of that normally required for lubrication is required to be forced into the track roller mechanism to expel from the main bearing parts the old lubricant in order to remove accumulations of dirt and dust which, when compacted with the used grease, increase friction and cause local heating effects.

A composition to be suitable therefore as a lubricant for such machinery as chassis parts of automobiles, cars and tractors must have many unusual characteristics. The composition must clearly have the following characteristics: being unusually tacky and adhesive in nature; having the capacity to withstand severe load and shock operations even when the machinery is functioning submerged in a muddy or water-drenching environment; having the capacity of being sufficiently mobile to be handled and dispensed at normal atmospheric temperatures from grease guns ordinarily available at commercial outlets; and consistency to be able to flow under its own weight but yet not fluid enough to leak out or be splattered from the machinery parts under operating conditions. An added characteristic of a suitable lubricating grease for such type machinery is that the composition must preferentially wet metallic surfaces even when heated or when submerged in water and maintain under these conditions a persistently heavy film of lubricating properties which will also act as a seal against the entrance of water and dirt to the bearing surfaces during operating conditions.

Criteria of quality of grease compositions are specific ranges in value of consistency as indicated by the work penetration test (A. S. T. M. D217, 33T) and the S. I. L. Mobilometer (Ind. Eng. Chem. An Ed. May 15, 1940, pages 285–7), of body density, of adhesiveness to metallic surfaces, of internal cohesion and of melting points. These characteristics depend upon the phsyical and chemical relationships of the ingredients in the composite and the reaction of the composite to the effects of speed, pressure and heat during service. In many commercial greases a relationship between the various constituents is desirably attained so that a composite is formed consisting of a minor portion of a colloidal dispersion of metal soaps in a relatively stable emulsion of a major portion of a colloidal dispersion of other and different type metal soaps in a mineral oil of suitable consistency. It is considered particularly important that the colloidal phase be relatively stable and form a satisfactorily adhesive lubricating film on the bearing surfaces and that the colloidal phase offer substantial resistance toward heat conduction from the surface film into the mass so as to minimize the effect of friction, speed and load during service upon the bulk of the grease composition.

The present invention relates particularly to stabilized aluminum soap grease compositions, containing aluminum stearate as the main metal soap ingredient. It has been known for some time that when aluminum stearate in an amount of about 8% by weight is admixed and heated with a mineral oil and the mass cooled, the desirable transition in structure of the mass, from being a stringy liquid to a consistency of a relatively solid gel, does not usually satisfactorily occur. The cause of the failure has not been definitely determined, but it would seem from photomicrographs to be due to a recrystallization of the aluminum stearate at a temperature below about 150° F. If the mineral oil-aluminum stearate mixture is rapidly cooled to a temperature of about 150° F. or below, the aluminum stearate crystallizes and there is obtained a mixture of oil and coarsely dispersed soap granules. In our copending application, Serial No. 255,542 now Patent No. 2,264,353, it was disclosed that by adding to the aluminum stearate about 10% by weight of either aluminum naphthenate or aluminum oleate admixed with about 20% free stearic acid, this difficulty was overcome and a lower transition temperature was obtained upon the composite than upon a mixture having the same metal soap content but consistng of aluminum stearate only. It was also disclosed that many commercial supplies of aluminum stearate vary in the percentage of free acidity from about 5% to 15% but that such free acidity was insufficient to have the desired lowering effect upon the transition temperature and to have the stabilizing effect during storage upon consistency. Thus, many processing difficulties in the manufacture of aluminum soap greases were overcome by adding to the aluminum stearate small quantities of either aluminum naphthenate or aluminum oleate.

In the prior art the cooling from 140° F. to 160° F. to permit the transition from the liquid to the gel structure was usually effected by pouring the hot liquid mixture from the heating equipment into shallow pans holding between about 50 and 100 pounds and having a depth of several inches and allowing the mass to cool overnight. The cooled mass from this pan cooling, as it is termed, was then passed to settling equipment which was usually the kettle equipment in which the mixture was previously heated, then stirred or reworked, at it is commonly termed, to develop a uniform consistency, and filtered into containers. This slow pan cooling and reworking procedure was found to be the only satisfactory method of cooling the grease mixture to effect the desired transition in structure and developing therein a desirable consistency. In other type cooling equipment, such as the shipping containers, the grease mixture after cooling to atmospheric temperatures is found to be of a heterogeneous character, the center being a relatively liquid oil, while the outer portion is relatively hard, and upon reworking a uniform desirable consistency is seldom obtained.

The prior art procedures for preparing aluminum greases are thus time and labor consuming, required extensive floor space and due to the reworking required after such cooling, there is also involved a consistency loss based upon the quantity of aluminum stearate employed. In our copending application Serial No. 255,542, a formula and method for the preparation of satisfactory aluminum soap greases without the laborious and costly method of pan cooling were disclosed. Also disclosed in that application was that the addition of small quantities of free stearic acid to the grease mixture improved the stability of the composition during storage especially as regards the development of increased consistency.

It has now been found that compounds other than aluminum naphthenate and aluminum oleate admixed with free stearic acid have the ability to lower the transition temperature of aluminum stearate-mineral oil mixtures and that acids other than stearic acid improve the stability of aluminum soap grease compositions during storage. The newly discovered effective compounds are naphthenic acids and fatty acids in general containing between about 10 and 20 carbon atoms in the molecule, especially oleic acid, in amounts of about 10% by weight of the aluminum stearate. It has been found that with these compounds the total soap admixture to the oil may be reduced and that the transition temperature of the composite may be reduced from the temperature range of between 150° F. and 160° F. for mineral oil-aluminum stearate mixtures to between 110° F. and 120° F. and even as low as between 90° F. and 100° F. when the naphthenic acids are employed. Furthermore, the grease compositions containing aluminum naphthenate or aluminum oleate, or oleic acid or naphthenic acids in amounts of about 10% by weight of the stearate can be quickly cooled to the temperature at which transition occurs without any substantial recrystallization or partial recrystallization of the aluminum stearate and there is obtained after such cooling, a smooth, unctuous product having no grainy structure.

In this regard, attention is directed to Figure 1. In Figure 1 there is presented a series of curves showing the effect of maintaining at relatively constant atmospheric conditions various grease compositions containing aluminum stearate in an amount of 7% by weight relative to the mineral oil as obtained by plotting worked penetration data and time in hours. Comparison between four of the curves, namely A, B, C and H shows that a grease mixture containing 0.7% aluminum naphthenate and 1% oleic acid in addition to the 7% aluminum stearate blended in the oil can after heating be cooled very satisfactorily to a temperature of 116° F. to effect the desirable structural transition to a gel, whereas in the absence of these compounds an aluminum stearate-mineral oil grease of less satisfactory consistency is obtained by cooling to 156° F. and very unsatisfactory compositions are obtained by cooling to temperatures of 148° F. and 140° F. Comparison of the four curves C, D, E and F shows that the impurities associated with the aluminum stearate in commercial supplies determine for the composition the transition temperature and instability as regards consistency during storage. Comparison of curves G and H shows that the extent of the effect of aluminum naphthenate and oleic acid upon the transition temperature of aluminum stearate is dependent upon the impurities associated with the aluminum stearate but that otherwise the effect upon aluminum stearate in mineral oil is substantially the same as indicated by the related consistency values for both compositions after ten hours' storage.

The further effects of the newly discovered active compounds in blending with aluminum stearate in mineral oil to give greases of desirable highly stabilized consistencies containing lower soap contents and of permitting rapid cooling to the lower transition temperatures, are shown by the following tabulation of data:

at a temperature between about 280° F. and 350° F.

| Soap Composition | | Transition | | Worked penetration | Remarks |
|---|---|---|---|---|---|
| Percent content | Type | Temp. | Time | | |
| | | °F. | Hours | | |
| 9.0 | Commercial aluminum stearate, $C_1$, only | 145-160 | 8-12 | 330 | Satisfactory (pan cooling). |
| 7.0 | ___do___ | 145-160 | 8 | 350-370 | Grainy fluid unsatisfactory if quick chilled below the transition temperature but if held and slowly cooled by pan cooling the grease is satisfactory. |
| 7.7 | 90% commercial aluminum stearate, $C_2$, +10% aluminum naphthenate. | 116 | 20 | 330 | Satisfactory. |
| 6.6 | 90% commercial aluminum stearate, $C_4$, +10% aluminum naphthenate. | 115 | 1 2 | 340 | Do. |
| 6.6 | ___do___ | 124 | 20 | 365 | Do. |
| 6.6 | ___do___ | 115 | 1 | 345 | Do. |
| 6.6 | 6% commercial aluminum stearate, $C_4$, +1% naphthenic acid. | 92 | 2 | 357 | Do. |

1 Maintaining the grease composition at 115° F. for an additional 20 hours had negligible effect on the properties.

In preparing the aluminum soap grease compositions of this invention, the oil employed is preferably derived from the naphthene base crude as, for example, oils of the Coastal type. The viscosity of the oil is usually above about 85 seconds Saybolt at 210° F. and preferably from 75 to 220 seconds Saybolt at 210° F. The aluminum soaps are added to the oil at a temperature of between 280° F. and 300° F. and the mixture heated in the usual type heating kettle to obtain a relatively homogeneous mixture. The heating kettle is furnished with close fitting scrapers for example, small steel scrapers attached to the outer edge of the sweep and kept at close scraping relation by means of adjusting screws. The particularly close scraping insures thorough mixing of the mass, reduces the formation of a grease composition of lumpy consistency, increases the transfer of heat into the mass, and thus reduces the time of cooking.

The mass of aluminum stearate usually employed is between 3 and 8% and preferably about 5% by weight of the oil. It is to be understood that in this blending aluminum soaps of saturated fatty acids containing between about 10 and 20 carbon atoms in the molecule other than stearic acid, may be employed and that aluminum stearate is but a preferred compound. The admixture of the aluminum naphthenate or aluminum oleate or free fatty acid or naphthenic acids in amounts of about 10% by weight of the aluminum stearate overcomes the tendency of the stearate to set upon cooling to a hard gel and permits the mixture to be cooled quickly, and the use of any device of suitable form capable of rapidly and uniformly cooling the mixture. Usually in incorporating the soap additives into the mineral oil the mixing is made first with about 10 to 20% of the total quantity of the oil to be used and the mixture worked into a thick paste. The paste is then stirred into the balance of the oil which is heated during stirring to a temperature between 280° F. and 350° F. and held at that temperature until all the soap is thoroughly incorporated into a smooth, homogeneous mixture. The aluminum naphthenate of commerce varies considerably according to its oil content and if it is very well de-oiled, it generally requires a higher temperature in order to bring it into solution. In such a case it is found preferable to add aluminum naphthenate to the oil and to heat up the mixture to a temperature of between 350° F. and 450° F. while stirring and then to add the aluminum naphthenate-oil concentrate to the aluminum stearate-oil mixture at a temperature between about 280° F. and 350° F.

The mass after heating in the kettle is then rapidly cooled by passing through any type of cooling equipment capable of rapidly and uniformly cooling the mixture. The cooling is effected to a temperature of about the transition temperature or even slightly below. Suitable means of cooling the mass are the pan cooling as in the prior art, or the use of any jacketed equipment in which the mass is relatively uniformly cooled. While the grease material is being cooled to about the transition temperature the mass is agitated. When the temperature of about transition is reached the agitation is discontinued and the mass allowed to cool further in order to permit the desirable change in texture of the mixture to occur.

The grease so obtained is fluid enough to have the capacity of just flowing under its own weight at room temperatures and has an A. S. T. M. penetration of between 300 and 400 at 77° F. A grease of this type can be dispensed readily from a grease gun of the ordinary type available at commercial outlets at temperatures as low as 10° F. At the same time the grease composition is possessed of a high degree of adhesiveness to metallic surfaces. The grease composition may also contain other ingredients as desired. For example, the viscosity of the grease may be considerably increased by the addition of oil thickeners such as polymers of olefins especially of the iso-olefins, and particularly of isobutylene and the iso-amylenes. For this purpose, the polymers having molecular weights of between 30,000 and 200,000 are preferred and they are ordinarily used in amounts from about 0.05% to 0.25%, depending upon the molecular weight of the polymer employed. Oxidation inhibitors of various types may be added to the oil as well as dyes, anti-corrosion or extreme pressure agents and the like which may be employed to impart other desirable qualities.

Figure 2:
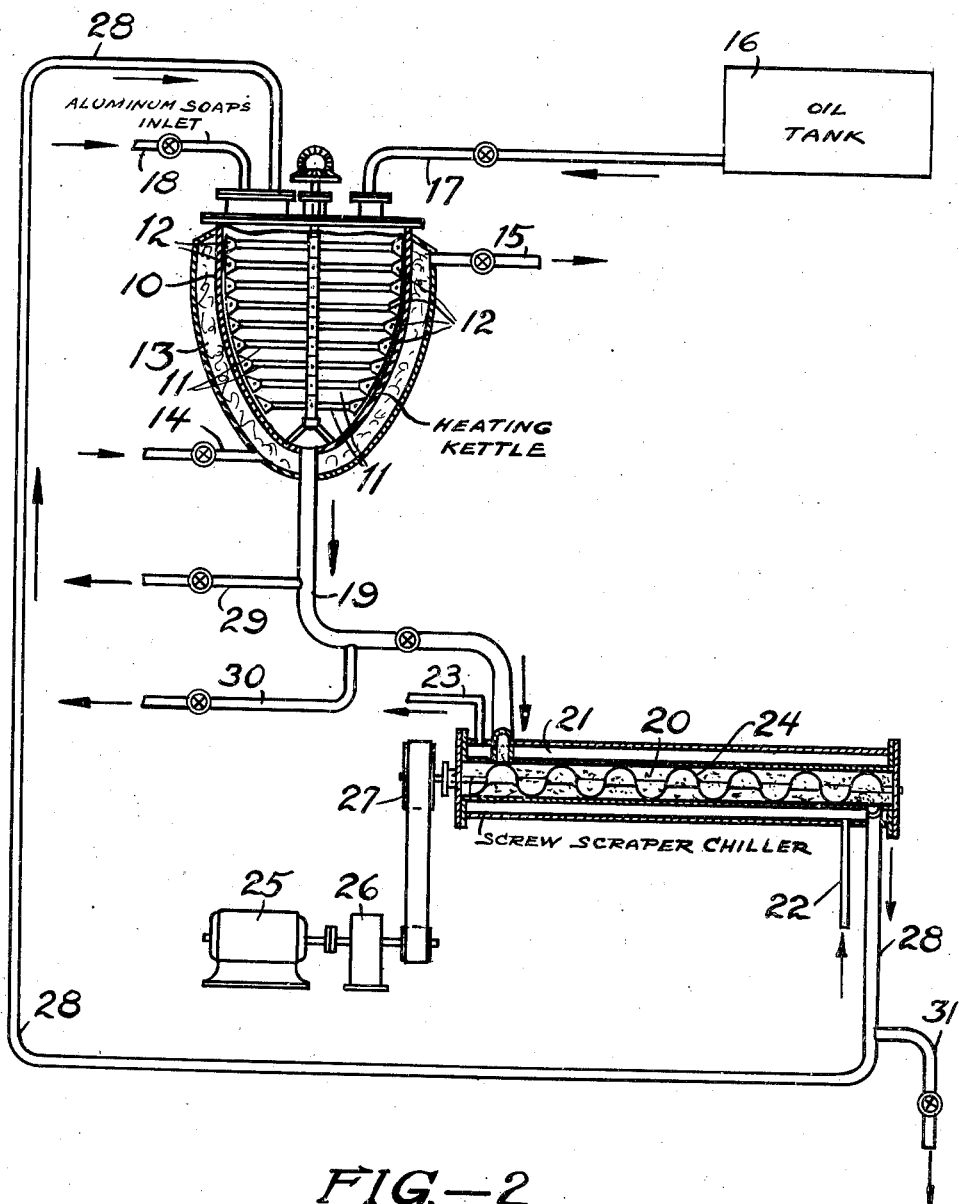

A procedure preferably employed in the preparation of the greases of this invention is indicated by the following description of a manufacturing process which should be read in conjunction with the drawings presented in Figure 2.

Figure 2 shows a jacketed kettle 10 fitted internally with paddles 11 having scraper terminals 12 which can be finely adjusted to work upon the entire surface of the kettle. The motion of the paddles in the kettle insures very complete and thorough agitation within the kettle. The jacket portion 13 of the kettle 10 is adapted for the passing in through line 14 and the passing out through line 15 of steam either under normal or superatmospheric pressure as temperatures within the kettle 10 require. Under the conditions of such means of agitation and of a temperature between about 280° F. and about 300° F., sufficient oil of suitable character as a mineral oil base for the preparation of the grease composition is supplied from storage tank 16 to the kettle 10 through line 17 and admixed with the aluminum soaps supplied through opening 18 to make a thick paste. Further quantities of oil to make the grease of desired consistency are then supplied through line 17 and the mass agitated until a smooth homogeneous composition is obtained.

When the mass in the kettle has become smooth and homogeneous, the mixture is passed from the bottom of the kettle through line 19 to a screw scraper chiller 20. The chiller 20 has an outer jacket 21 through which a cooling medium, usually water, passes in through line 22 and out through line 23. The screw 24 within the chiller is usually operated countercurrently to the direction of the flow of the grease from line 19 and countercurrently to the direction of the cooling fluid in the jacket 21. The scraper screw is operated by the motor 25 through gears 26 and transmission 27. The cooled grease passes from the chiller through line 28.

In batch operation the cooled grease is recycled through line 28 to the kettle 10. By such recycling the entire quantity grease composition is brought to about the transition temperature at about the same time. When this temperature within the mass is reached, agitation within the kettle is discontinued and the mass is allowed to settle and to cool further until the transition in structure has been satisfactorily effected. The gel composition is then removed from the kettle through a T 29 on line 19 and passed to shipping containers.

In continuous operation it is usual to employ a series of kettles similarly equipped to that designated by the numeral 10 and to pass the hot mixture to the chiller in a relatively continuous stream from the various kettles through the T 30 on line 19. In this manner of operation the cooling effected in the chiller 20 is more complete than that in batch operation, namely the cooling in the chiller is effected to about the transition temperature. The cooled grease in such operation is passed directly through a T 31 on line 28 to the shipping containers wherein settling and further cooling to atmospheric temperature are effected.

Example I

An aluminum stearate grease product was prepared by adding 5.0 parts by weight of aluminum stearate, 0.5 part of aluminum oleate, and 1.0 part of naphthenic acids to about 20 parts of a naphthene type lubricating oil which had an initial viscosity of 160 seconds Saybolt at 210° F. The ingredients were stirred together to a thick paste, all lumps of aluminum stearate being carefully rubbed out. 72.5 parts of the same naphthene type oil as previously used were now added and the mixture heated while stirring to about 280–300° F. Stirring was continued for approximately one hour or until the mixture was found to be completely homogeneous. One part of a 6.0% oil solution of a linear polymer of isobutylene, the isobutylene having a molecular weight of about 40,000 to 60,000 was added. This material was pumped out of the kettle and through a Carbondale type chiller in which the flow of the grease through the chiller was opposite to that of the motion of the screw and to the direction of the cooling water in the jacket. Operation of the chiller in this way adds between 20 and 40 p. s. i. to the back pressure. The most satisfactory screw rotation for the particular type Carbondale chiller employed was 150 R. P. M. from the standpoint of cooling efficiency. The grease was cooled in one pass through this chiller to 95° F. and drawn directly to the containers of the size desired.

The resulting grease had a worked A. S. T. M. penetration of 360, and was exceptionally smooth and transparent, and was highly adhesive. It could be readily dispersed through the usual grease guns available at commercial outlets and was found to flow under its own weight at temperatures above 30° F.

Example II

A chassis lubricant was made by adding 3.6 parts by weight of aluminum stearate containing 10% of free fatty acid, 1.0 part of oleic acid and 0.4 part of aluminum naphthenate (the naphthenic acid obtained from Venezuelan gas oil) to about 20 parts of a naphthene lubricating oil which had an initial viscosity of 175 seconds Saybolt at 210° F. The ingredients were stirred together in a thick paste and after thorough incorporation, 74 parts of the same lubricating oil previously used were added and the mixture was heated while stirring to about 280° F. The stirring continued for about two hours and the mixture was found to be completely homogeneous. While still fluid, one part by weight of a 6.0% oil solution of a linear polymer of isobutylene having a molecular weight of about 40,000–60,000 was added for the purpose of thickening the oil. On cooling, the mixture set into a soft solid body which was then worked into a smooth, semi-fluid grease which was just soft enough to flow under its own weight at room temperature.

The semi-fluid grease had an A. S. T. M. penetration of 390–400 at 77° F. It was highly adhesive and showed little or no tendency to splatter or to drop from the shackles or springbolts of an automobile chassis. The composition was readily dispensable at 0° F. from a grease gun commonly available at commercial grease outlets. The following table shows the effect of the free fatty acid upon the consistency during storage:

*A. S. T. M. penetration*

| Free fatty acid in the aluminum stearate | Grease freshly prepared as described above | After two weeks' storage @ 75° F. |
|---|---|---|
| *Percent* | | |
| 0.0 | 390 | 310 |
| 15 | 390 | 350 |
| 20 | 390 | 385 |

As a comparison of the lubricating quality, greases of similar consistency and of the following compositions were prepared:

| | Composition A | Composition B | Composition C |
|---|---|---|---|
| Aluminum stearate | 4.0 | 3.6 | 3.3 |
| Aluminum oleate | | 0.4 | |
| Aluminum naphthenate | | | 0.4 |
| Oleic acid | | | 1.0 |
| Stearic acid | | ¹1.0 | |
| Oil solution polybutene | 1.0 | 1.0 | 1.0 |
| Mineral lubricating oil | 95.0 | 94.0 | 94.3 |

¹ Over the free stearic acid already contained in the aluminum stearate.

The three greases were tested in crawler-type tractor with the following results:

Number of days run on test—7.
Air temperature—25°-30° F. Ground frozen.

|  | Composition A | Composition B | Composition C |
| --- | --- | --- | --- |
| Average temperature of rollers | 150-170° F | 120-150° F | 90-110° F. |
| Number of roller failures | 4 | 2 | 0. |
| Temperature at failure | 500+ | 500+ |  |
| Condition of rollers after tests | Brass bushings tend to swell against shaft. Shaft blue colored and brass swelled tight against shaft in case of failure. | Same as composition A | Like original—well lubricated. |
| Quantity of lubricant used | Rollers filled. 12 oz. in bottom rollers; 3 oz. in top rollers. | Same as composition A | Same as composition A. |
| Average consumption | The grease could be added only at temperatures above 30° F. and the usual grease gun equipment could not be used because the grease would not flow to the pump. Complete refilling of the upper rollers every day and sometimes 2 times a day was necessary due to the improper feeding of the grease in the track rollers. Part running hot and the grease running out through the seal. This generally necessitated 3 lubrications per day. | Complete refilling of upper rollers every day. Lower rollers had to be refilled twice each day. Sometimes necessary to relubricate rollers 3 times per day when running very hot. Noticeable leakage through seals. | 1½ oz. of grease every 2 days to upper rollers. 4 oz. of grease gun added every 2 days to bottom rollers. |

The present invention is not to be limited by any theory of a method of manufacture, or to any particular type of aluminum soaps, but only to the following claims or their equivalents.

We claim:

1. A lubricating grease capable of flowing under its own weight at normal atmospheric temperatures for machinery operating under conditions of local high temperature increase, or irregular and shock load effects and of frictional forces beyond the film strength of any hydrocarbon lubricating oil, comprising a viscous hydrocarbon naphthenic base oil compounded in grease forming proportions of between about 3% and 8% of an aluminum soap of a saturated fatty acid containing between 10 and 20 carbon atoms in the molecule and a substantially lesser amount of an unsubstituted carboxylic acid compound of the class consisting of unsaturated fatty acids containing between 10 and 20 carbon atoms in the molecule, naphthenic acids and their aluminum derivatives as a crystallization inhibitory compound for said aluminum soaps in mineral oil.

2. A lubricating grease according to claim 1 in which the compound inhibiting the crystallization in mineral oil of the aluminum soap of the fatty acid containing between 10 and 20 carbon atoms in the molecule is an unsaturated fatty acid containing between 10 and 20 carbon atoms in the molecule.

3. A lubricating grease according to claim 1 in which the compound inhibiting the crystallization in mineral oil of the aluminum soap of the fatty acid containing between 10 and 20 carbon atoms in the molecule is a mixture of the aluminum soap of an unsaturated fatty acid containing between 10 and 20 carbon atoms in the molecule and an unsaturated fatty acid containing between 10 and 20 carbon atoms in the molecule.

4. A lubricating grease for the chassis parts of automobiles and crawler-type tractors comprising a viscous naphthenic base lubricating oil compounded in grease forming proportions with about 3% to 8% of an aluminum soap in a saturated fatty acid containing between 10 and 20 carbon atoms in the molecule and not more than 1.5% of an unsubstituted carboxylic acid compound of the class consisting of unsaturated fatty acids containing between about 10 and 20 carbon atoms in the molecule, naphthenic acids and their aluminum derivatives as a crystallization inhibitory compound for said soap in mineral oil.

5. A lubricating grease for the chassis parts of automobiles and crawler-type tractors comprising a viscous naphthenic base lubricating oil compounded in grease forming proportions with about 3% to 8% of aluminum stearate and from about 0.25% to 1.5% of an unsubstituted carboxylic acid compound of the class consisting of unsaturated fatty acids containing between 10 and 20 carbon atoms in the molecule, naphthenic acids and their aluminum derivatives as a crystallization inhibitory compound for aluminum stearate in said viscous lubricating oil, the same being incorporated so as to form a homogeneous semi-fluid grease just capable of flowing under its own weight at room temperature.

6. A lubricating grease for the chassis parts of a crawler-type tractor comprising a mineral naphthenic base lubricating oil having a viscosity of from 160 to 180 seconds Saybolt at 210° F. compounded in grease forming proportions with about 3% to 8% of aluminum stearate, about 0.25% to 1.5% of an unsubstituted carboxylic acid compound of the class consisting of unsaturated fatty acids containing between 10 and 20 carbon atoms in the molecule, naphthenic acids and their aluminum derivatives as a crystallization inhibitory compound for said quantity of aluminum stearate in said mineral lubricating oil, the same being worked into a homogeneous semi-fluid grease having a penetration of between 300 and 400 at 77° F.

7. A lubricating grease for the chassis parts of crawler-type tractors according to claim 6 in which the compound inhibiting the crystallization in mineral oil of the aluminum stearate is oleic acid.

8. A semi-fluid lubricating grease for the chassis parts of crawler-type tractors comprising a mineral naphthenic base lubricating oil of from 150 to 200 seconds Saybolt at 210° F., about 5% of aluminum stearate, about 0.5% of a petroleum naphthenic acid and about 0.1% of polyisobutylene as a thickener, the whole being worked into a semi-fluid grease having a penetration of between 300 to 400 at 77° F. and just capable of flowing under its own weight at room temperature.

9. A lubricating grease for machinery operating under conditions of local high temperature increase, of irregular and shock load effects and of frictional forces beyond the film strength of any hydrocarbon lubricating oil, comprising a viscous hydrocarbon naphthenic base oil compounded in grease-forming proportions with an aluminum soap of a saturated fatty acid and a lesser amount of a naphthenic acid as a crystallization inhibitory compound for said aluminum soap in the mineral oil.

10. A lubricating grease for the chassis parts of a crawler-type tractor comprising a mineral naphthenic base lubricating oil having a viscosity of from 160 to 180 seconds Saybolt at 210° F. compounded in grease-forming proportions with about 3 to 8% of aluminum stearate, about 0.25 to 1.5% of a petroleum naphthenic acid as a crystallization inhibiting compound for said quantity of aluminum stearate in said lubricating oil, the same being worked into a homogeneous semi-fluid grease having a penetration of between 300 and 400 at 77° F.

JOHN C. ZIMMER.
ARNOLD J. MORWAY.